(12) United States Patent
Varga

(10) Patent No.: US 6,213,672 B1
(45) Date of Patent: Apr. 10, 2001

(54) TELESCOPING POLE & CLEANING TOOL

(76) Inventor: George J. Varga, 6383-3 Riverwalk La., Jupiter, FL (US) 33458

( * ) Notice: Subject to any disclaimer, the term of this patent is extended or adjusted under 35 U.S.C. 154(b) by 0 days.

(21) Appl. No.: 09/374,748

(22) Filed: Aug. 13, 1999

Related U.S. Application Data

(63) Continuation-in-part of application No. 08/969,413, filed on Oct. 21, 1997.

(51) Int. Cl.⁷ ............... F16B 7/10; F16L 47/00; B25G 1/00; A47L 13/00
(52) U.S. Cl. .......... 403/109.2; 285/303; 403/109.1; 403/109.3; 15/144.4; 16/115
(58) Field of Search ............... 403/109.1, 109.2, 403/109.3, 109.6, 109.8, 379.5, 378; 15/144.3, 144.4; 16/115; 285/303, 3

(56) References Cited

U.S. PATENT DOCUMENTS

| | | | |
|---|---|---|---|
| 1,007,512 | * | 10/1911 | Aardahl . |
| 2,864,100 | | 12/1958 | Bruger . |
| 3,244,437 | * | 4/1966 | Belicka ............... 285/303 |
| 4,003,668 | * | 1/1977 | Kelly, III et al. . |
| 4,524,484 | * | 6/1985 | Graham ............... 16/115 |
| 4,594,824 | | 6/1986 | Ziegler et al. . |
| 4,793,646 | * | 12/1988 | Michaud, Jr. . |
| 4,904,379 | | 2/1990 | Ward . |
| 4,932,176 | | 6/1990 | Roberts et al. . |
| 5,105,752 | * | 4/1992 | Pompei et al. . |
| 5,209,176 | * | 5/1993 | Pompei et al. . |
| 5,271,682 | * | 12/1993 | Realdon . |
| 5,333,422 | | 8/1994 | Warren et al. . |
| 5,336,012 | | 8/1994 | Newville . |
| 5,337,989 | | 8/1994 | Apple . |
| 5,343,587 | * | 9/1994 | Findley ............... 15/144.4 |
| 5,387,048 | | 2/1995 | Kuo . |
| 5,449,100 | | 9/1995 | Eckhart . |
| 5,515,574 | * | 5/1996 | Larson ............... 403/109 |
| 5,591,507 | * | 1/1997 | Jones . |
| 5,799,357 | * | 9/1998 | Taylor ............... 15/144.4 |
| 5,940,933 | * | 8/1999 | Chang . |

FOREIGN PATENT DOCUMENTS

| | | |
|---|---|---|
| 548005 | 5/1931 | (DE) . |
| 524030 | 7/1940 | (GB) . |

\* cited by examiner

Primary Examiner—Lynne H. Browne
Assistant Examiner—Tomlyne A Malcolm
(74) Attorney, Agent, or Firm—Curtis L. Harrington

(57) ABSTRACT

A telescoping self-aligning tube having an inner tube dimensioned and configured to fit within an outer tube which is equipped with a guide slot for receiving a snap button, thereby preventing rotation of the inner tube relative to the outer tube. The guide slot allows the telescoping tube to self-align such that the user does not have to twist and maneuver the inner and outer tubes when changing the tube length in order to align a detent button with its detent hole. Embodiments include detent holes located both within and radially opposite with respect to the guide slot. A Foam insert may be located on both ends of the inner tube allow the telescoping tube to be buoyant. A special layer of rubberized or polymer coating protects the cleaned surface from abrasions due to contact with the telescoping tube.

19 Claims, 4 Drawing Sheets

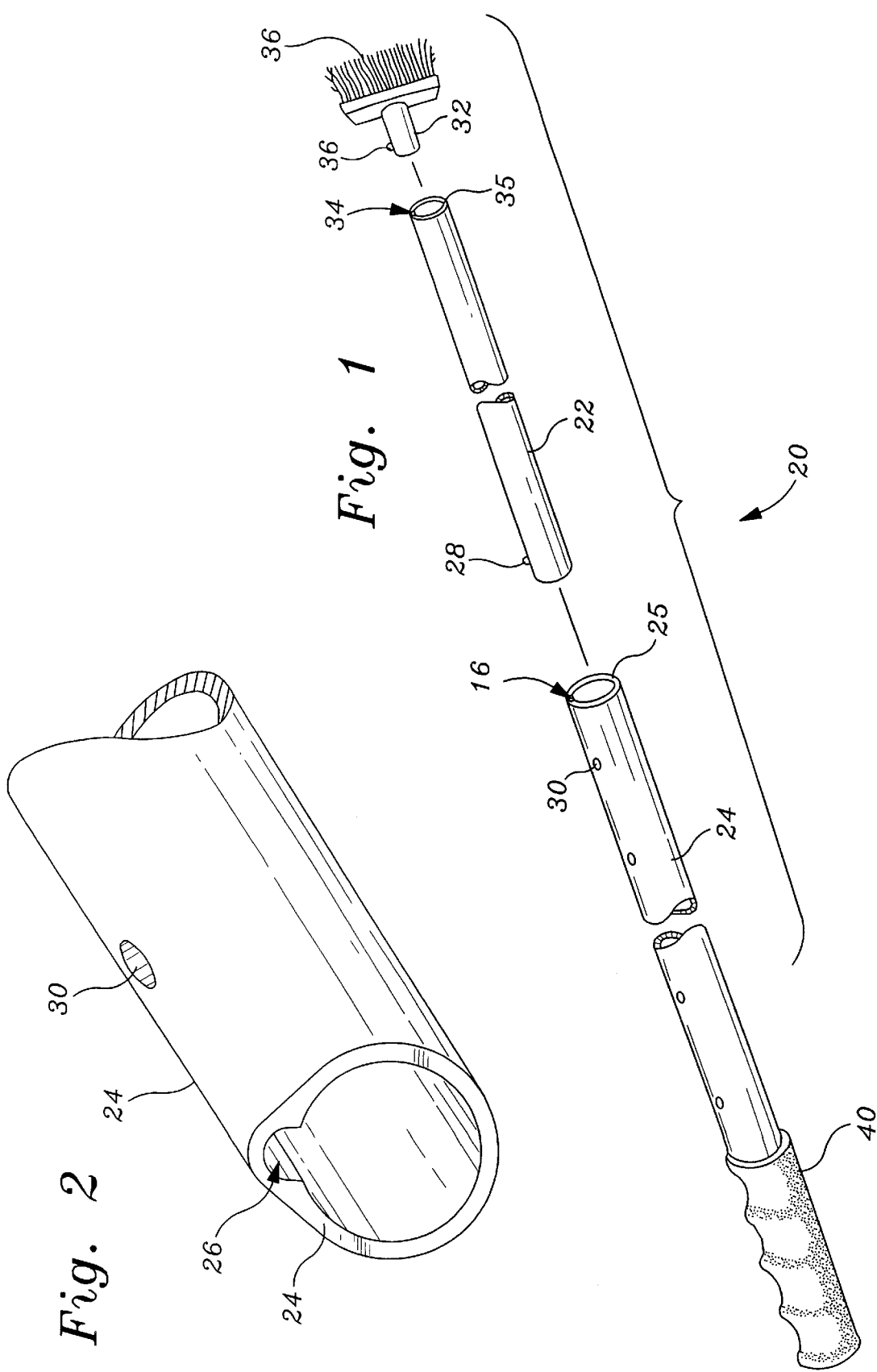

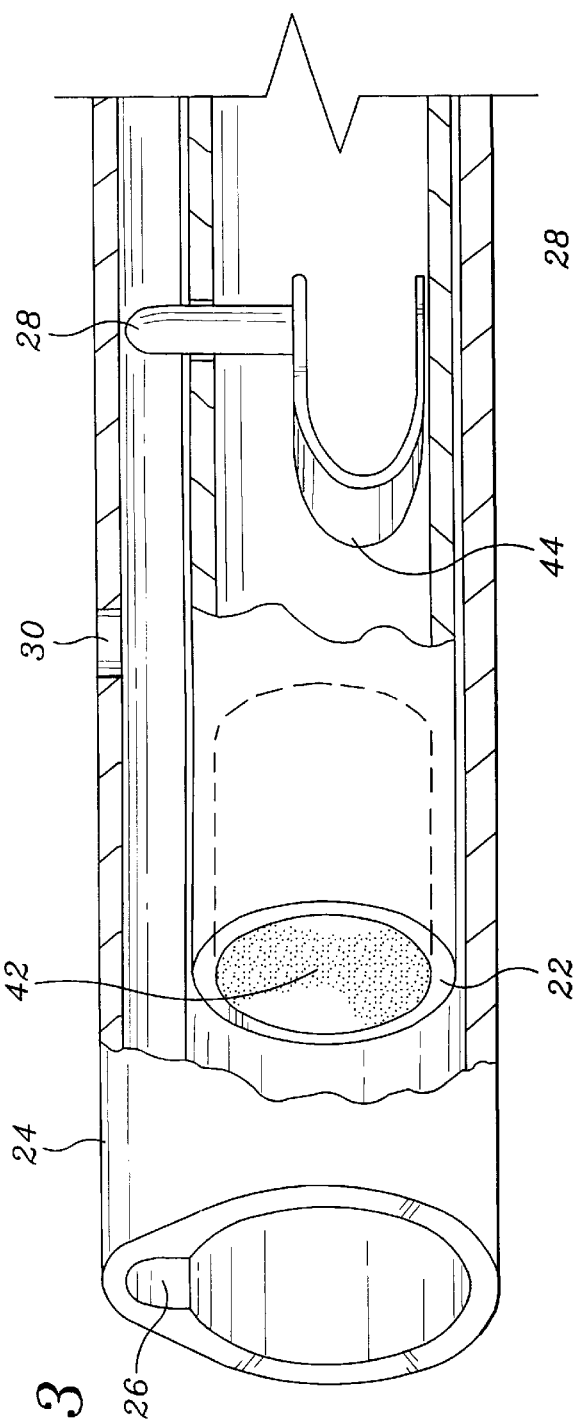
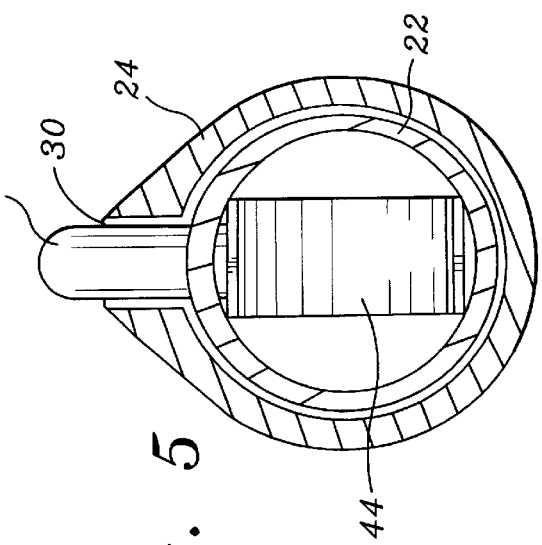
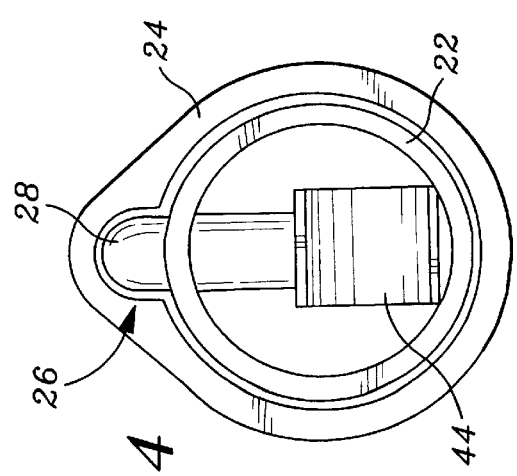
Fig. 3
Fig. 5
Fig. 4

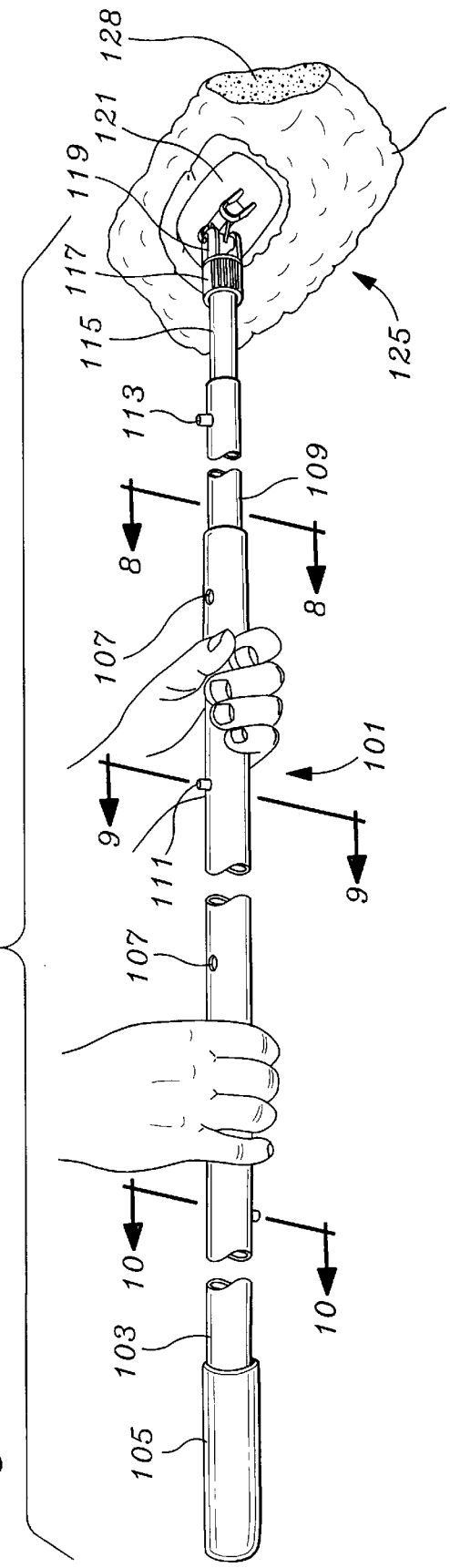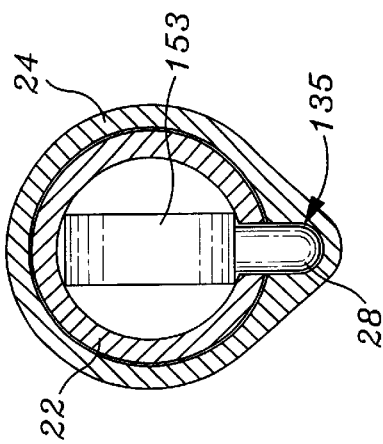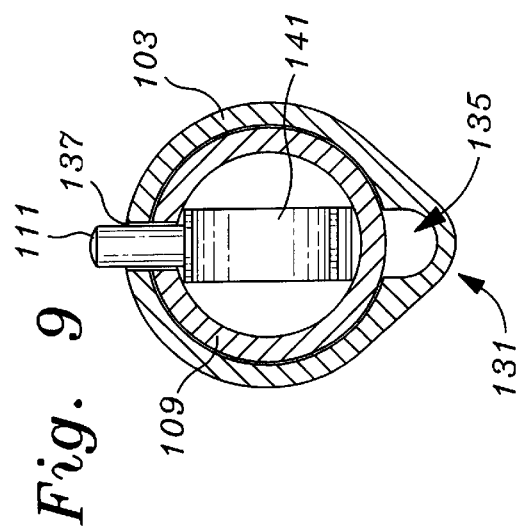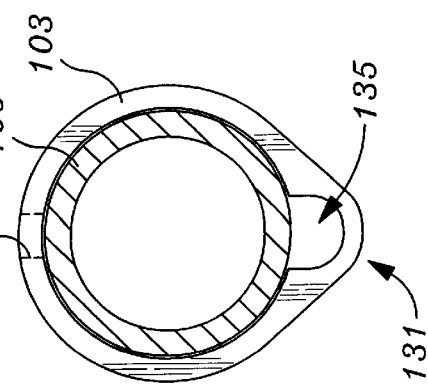

TELESCOPING POLE & CLEANING TOOL

Continuation-in-Part of co-pending U.S. Pat. No. 08/969,413 filed on Oct. 21, 1997.

FIELD OF THE INVENTION

The present invention relates to telescoping poles, and more specifically, to a telescoping pole having a tubular outer pole, having a keying guide running the length of its inner surface and penetrated by a series of locking holes, and an inner pole having a spring biased button protruding from the outer surface which button tracks the keying guide, thereby preventing the telescoping inner pole from rotating within the outer pole and simultaneously maintaining padial alignment of the button with each locking hole for ease of securing a telescoped configuration.

DESCRIPTION OF THE PRIOR ART

Extension poles are useful in numerous applications. One such application involves cleaning devices, such as mops or the like. In marine applications, for instance to clean boat hulls, the poles (normally stainless steel, aluminum or other metals) are not buoyant, and thus will sink when dropped in the water. Poles are thus frequently lost and can negatively effect worker productivity. Moreover, the most commonly used and available telescoping poles are circular in cross section, which lock at a desired telescoped extension length by means of a spring biased locking button which passes through a hole formed in the outer cylindrical pole. When the hole and the button engage, the pole is mechanically locked into position and can be released by manual pressure on the button. However, another frustrating and time consuming problem becomes evident in marine applications, particularly when quickly retrieving lines by means of hooks attached to, a telescoping pole. When a user tries to expand or retract the pole, the inner pole with the snap button fastener often rotates, thus mis-aligning the button with the corresponding hole in the outer pole, thus preventing engagement of the hole and button. To remedy the situation, the user generally twists and turns the poles relative to each other in what sometimes seems a futile attempt to align the snap button with the corresponding hole until the snap button engages.

Finally, another problem associated with using telescoping poles in marine environments is the marring of finishes or surfaces, due to inadvertent contact of the bottom portion of most poles with, such surfaces. Such contact can leave unsightly marks or nicks on the surfaces of boats and other smoothly finished products.

Of course, numerous other applications can be envisioned other than marine applications in which such problems can be a nuisance. Therefore, a telescoping cleaning pole that is lightweight, buoyant, incorporates a guide member to ensure that the inner and outer poles stay radially and axially aligned with each other, and has a protective coating to prevent nicks or marks on the cleaned surface would be highly desirable to anyone. who has occasion to. use telescoping poles. There is, therefore, a need for a lightweight, buoyant, telescoping cleaning pole that automatically keeps the inner and outer pole in perfect alignment to each other and greatly reduces the possibility of nicks or marks on a finished surface due to inadvertent contact with the telescoping pole. The present invention provides such a device.

Telescoping poles have been described in the patent literature; however, none address the above mentioned problems or needs. For example, U.S. Pat. Nos. 4,594,824 issued to ZIEGLER et al. on Jun. 17, 1986, U.S. Pat. No 4,932,176 issued to ROBERTS et al. on Jun. 12, 1990, U.S. Pat. No 5,271,682 issued to REALDON on Dec. U.S. Pat. No 21, 1993, and U.S. Pat. No 5,333,422 issued to WARREN et al. on Aug. 2, 1994, all describe extendable telescoping pole-like structures but fail to disclose a buoyant lightweight pole having a self-aligning spring biased snap button assembly.

U.S. Pat. No. 5,337,989 issued to APPLE on Aug. 16, 1994, British Pat. No. 524,030 issued on July 1940, and German Pat. No. 548,005 issued on May 1931 describe extendable poles but fail to disclose a telescoping lightweight buoyant pole having a self-aligning spring biased snap button assembly.

U.S. Pat. No. 5,336,012 issued to NEWVILLE on Aug. 9, 1994, discloses a telescoping washing and scrubbing brush handle that provides a leakage free connection between the inner and outer pole. However, the NEWVILLE patent does not disclose a buoyant telescoping pole having a self-aligning spring biased snap button in addition to a protective coating to reduce the likelihood of scratching the cleaned surface.

None of the above inventions and patents, taken either singly or in combination, is seen to describe the instant invention as claimed. Moreover, a need is shown for a telescoping pole which, regardless of application, is able to solve the aforementioned problems related to marring, buoyancy and misalignment of telescoping components.

SUMMARY OF THE INVENTION

Accordingly, it is a principal object of the invention to provide a telescoping pole that is both lightweight and buoyant. It is another object of the invention to provide a telescopic pole that has a self aligning spring biased snap button. It is a further object of the invention to provide a telescoping pole having a coating to prevent or reduce the occurrence of nicks or marks on the cleaned surface.

Still another object of the invention is to provide a telescoping pole having a self aligning snap button to receive a cleaning implement.

It is an object of the invention to provide improved elements and arrangements thereof in an apparatus for the purposes described which is inexpensive, dependable and fully effective in accomplishing its intended purposes.

The present invention accomplishes these objectives by providing a telescoping self aligning pole having an inner pole dimensioned and configured to fit within an outer pole which is equipped with a guide for receiving a snap button, thereby preventing rotation of the inner pole relative to the outer pole. The guide allows the telescoping pole to self-align such that the user does not have to twist and maneuver the inner and outer poles when changing the pole length.

Located on the front of the inner pole is a snap button which fits within the guide of the outer pole and is thereby guided along a straight path towards a plurality of holes located along the outer pole in communication with and axially aligned with the guide. Once the snap button is positioned under a corresponding hole, the force of a spring member attached to the snap button forces the snap button into the hole. This snap action causes the inner and outer poles to become locked without need for rotation of the poles relative to one another.

Foam inserts located on both ends of the inner pole allow the telescoping pole to be buoyant. A special layer of rubberized or polymer coating protects the cleaned surface from abrasions due to contact with the telescoping pole.

The above noted and other objects of the present invention will become readily apparent upon further review of the following specification and drawings.

BRIEF DESCRIPTION OF THE DRAWINGS

Objects and features of the invention will become apparent from a reading of a detailed description in conjunction with the drawing, in which:

FIG. 1 is a perspective view of the preferred embodiment of the Present invention with a cleaning attachment included;

FIG. 2 is a fragmented, perspective view showing the preferred embodiment of the outer telescoping pole;

FIG. 3 is a fragmented, perspective button assembly disposed within the inner pole which in turn is disposed within the outer pole;

FIG. 4 is an end view of the present invention as shown in FIG. 3;

FIG. 5 shows a cross sectional view wherein the snap button is shown in the popped out position passing through an aperture of the outer pole;

FIG. 7 is a side view of an additional embodiment where the guide slot is located oppositely to the detent apertures and where the guide slot operates with a locating button separate and apart from the detent button;

FIG. 8 is a cross sectional view taken along line 8—8 of FIG. 7 and illustrating the separately located guide slot apart from a detent aperture;

FIG. 9 is a cross sectional view taken along line 9—9 of FIG. 7 and illustrating the separately located guide button within the guide slot;

FIG. 10 is a cross sectional view taken along line 10—10 of FIG. 7 and illustrating the separately located detent button apart from and oppositely oriented with respect to the guide slot;

Similar reference characters denote corresponding features consistently throughout the attached drawings.

DETAILED DESCRIPTION

Figure 6:
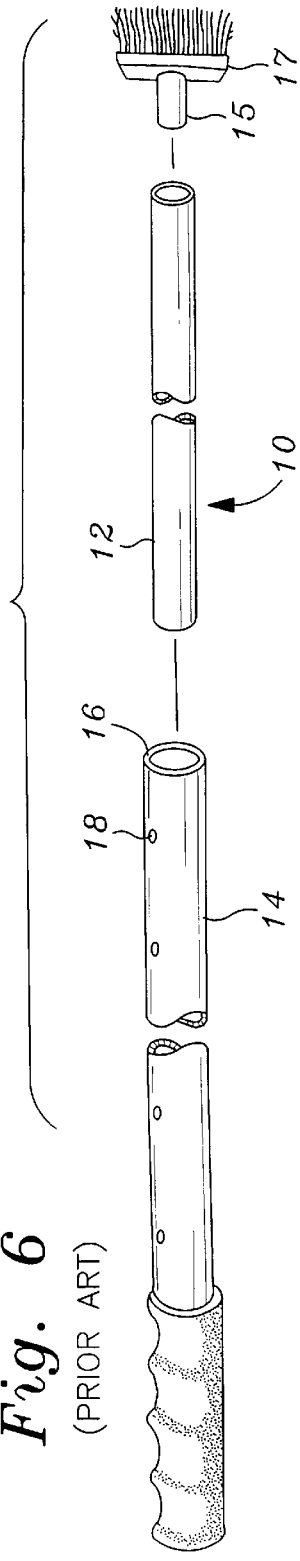
FIG. 6 is a perspective view of a conventional telescoping cleaning pole as known in the prior art.

As a matter of background, FIG. 6 of the drawings shows a conventional telescoping pole 10 as known in the prior art having a cylindrical inner pole 12 and a cylindrical outer pole 14. The inner pole 12 telescopes from within the outer pole 14 and includes means for locking the poles in an extended, telescoped position via a conventional snap button (not shown) The snap button has a head which is dimensioned and configured to protrude through both a first aperture in the inner pole and an aperture of the outer pole when brought into registry with the first aperture. Furthermore, the snap button is biased by a biasing means disposed within the inner pole 12. Thus, when the head of the snap button is manually depressed and by axially extending the inner pole relative to the outer pole, the snap button head can be made to pass within the cavity of the cylinder of the outer pole 14 until it reaches and passes through one of a plurality of holes 18 of the outer pole 14.

The terminal end 16 of the outer pole provides a representative profile of the cross-section of the inner surface of the outer pole 14. The profile shows that conventional poles are not equipped to guide the inner pole 12 along any one orientational path, nor prevent either inner pole 12 and its attached cleaning attachment, having cylindrical adapter 15, from rotating out of alignment with rotation of either outer pole 14 or inner pole 12 while being extended. Thus, the cleaning attachment 17 can easily come out of alignment with the hole for receiving the snap button provided in inner pole 12 and likewise, the inner pole snap button can become radially misaligned from the hole 30 of outer pole 14. Moreover, the inner pole 12 of telescoping pole 10 is not equipped with a foam core to add buoyancy.

Turning now to FIG. 1 of the drawings, the preferred embodiment of the telescoping pole 20 is shown, equipped with an inner pole 22 dimensioned and configured to fit in a sliding relationship with an outer pole 24. As shown in FIG. 1, both inner and outer poles 24, 22 have a cylindrical outer surface and an internal cavity, defined by a generally cylindrical interior surface except as later described. The distal end 25 of the outer pole 24 provides a representative profile of the cross-section of the inner surface of the outer pole 24. However, any cross-sectional configuration of a tube may be used, such as oval, teardrop, flattened teardrop, triangular, square or rectangular so long as the outer diameter of the tube comprising the inner pole 22 is slightly less than the inner diameter of the tube comprising the outer pole 24, so that the inner pole 22 telescopingly mates within outer pole 24.

Likewise, an adapter 32 attached to a cleaning element 38 is dimensioned and configured to be received by a distal end 35 of inner pole 24 and, as shown in FIG. 1, is provided with a cylindrical outer surface permitting insertion within the generally cylindrical cavity of inner pole 24.

Each of the outer and inner poles have an interior surface which is modified to form a guide 26. FIG. 2 shows an enlarged and detailed view of the guide 26 formed on the inner surface of the outer pole 24. Guide 26 could be provided in the form of a formed inner groove into the inner surface of an insert into the outer pole 24. The expanded frictional contact area would stabilize the insert with respect to the outer pole 24, but other stabilizing structures could be used. The guide 26 follows a straight path along the longitudinal axis defined between each end of one of the poles 22, 24. The guide 26 is a groove dimensioned and configured to receive a conventional snap button 28 which, as shown in FIG. 3, is attached to a U-shaped spring member 44, which assembly is nested in a biased position within inner pole 24. Snap button 28 can alternatively be any sort of screw, pin, dowel, or insertable and removable structure. FIG. 2 also shows an alternative configuration of the outer surface of outer pole 24, wherein the guide 26 is substantially deeper than the thickness of the wall forming outer pole 24, thereby resulting in a teardrop-like bulge of the cylinder.

The outer pole 24 is further provided with a plurality of holes 30 serially positioned in axial alignment with the guide 26, each hole 30 dimensioned to receive and thereby allow the snap, button 28 to engage the wall of the outer Pole 24. Regardless of the shape of the mating cross-sectional shape of the poles 22, 24 chosen, when inner pole 22 is pushed a sufficient distance into outer pole 24 while the snap button 28 is engaged so as to rest in guide 26, as shown in FIG. 4, the snap button 28 thereby prevents rotation of the inner pole 22 relative to the outer pole 24, resulting in a keying effect.

Again referring to FIG. 2, when the inner pole 22 is extended, the snap button 28 follows the axial path of the guide 26 and eliminates time delay otherwise caused by inadvertent rotation of the inner pole 22 by a user. However, when the snap button 28 approaches a hole 30 of the outer pole 24, the spring member 44 (being biased inward by virtue of contact with the interior surface of the outer pole 24) causes the snap button 28 to pop through hole 30, thereby engaging the inner and outer poles 22, 24 so as to become secured in a locked position, as shown in FIG. 5.

Inner pole 24 may be likewise provided with an inner guide 34 which, in the same manner as described above, permits snap button 36 of adapter 32 (FIG. 1) to pop up through a corresponding hole (not shown) and lock adapter 32 of cleaning element 38 within inner pole 22. Although not shown, snap button 36 is substantially similar to, and has the same type of associated spring member as, snap button 28. Thus, outer guide 26 and inner guide 34 ensure that a user can easily and quickly change the telescoped length of the poles or the accessory (i.e. change cleaning elements) without wasting precious time trying to adjust the alignment between adapter 32, inner pole 22 or outer pole 24.

Outer guide 26 and inner guide 34 and associated poles 24, 22 may be formed by any method of manufacture, including but not, limited to pinching, welding or stamping of suitable materials. The pole materials may be made from aluminum, iron, steel, stainless steel, fiberglass, plastic or other appropriate materials. Typically, such materials can be extruded, rolled molded, drawn or otherwise fabricated to incorporate a groove or any number of guides in accordance with the disclosure of the present invention.

Moreover, the device used to lock the poles together is not limited to the use of a snap button 28, but could include any type of mechanism that would enable the component to travel within the guide 26 and lock with a positive action within a hole 30. This would include springs, ball detent assemblies, screws, pins, dowels or any appropriate item that would provide a similar temporary locking action. Furthermore, the applications of such the present invention are not limited to cleaning applications, but may include such devices as flagpoles, tent or camper poles, rigging poles, and scaffolding and tower supports.

However, when used in cleaning applications, to prevent marring or damage by direct or indirect contact of telescoping pole 20 with a cleaned surface of the various materials and finishes found on boats, automobiles aircraft or any other finish, the pole is coated with a rubberized or polymer coating to provide a barrier between the pole and cleaned surface. This coating may be provided on each of the outer pole 24, inner pole 22 and adapter 32. A rubberized or polymer coating which establishes a barrier between said telescoping pole and the cleaned surface may be used, as chosen from the prior art.

Finally, as shown in FIG. 3 of the drawings, a buoyant foam core 42 is provided within inner pole 22. Buoyant foam 42 is intended to provide enough buoyancy of telescoping pole 20 to make it float in water, and can be introduced into the pole cavity by any means of method suitable or known in the art.

Referring to FIG. 7 a further embodiment is seen as a pole 101. From the end held by the user, it includes a relatively larger telescoping tube 103 having a handle 105 and detent engagement apertures 107. A relatively smaller telescoping tube 109 fits within the tube 103. The tube 103 is preferably tear drop shaped both to provide enhanced strength as well as to accommodate a separate groove guide. A detent locking button 111 is seen as engaging the tube 109 with respect to the tube 103. A detent locking button 113 is seen securing an adapter tube 115 into the tube 109. The adapter tube 115 is threadably inserted into a fitting 117. The fitting 117 is operably connected to a universal joint 119. The universal joint 119 attaches the fitting 117 to a flat member 121. Flat member 121 supports a sponge underneath its extent. An enveloping fleece material member secures the flat member 121 and underlying sponge material 125 to form a cleaning member 127 which can be positioned from a distance to a wide variety of orientations for providing surface cleaning. The tear drop shape of the tube 103 enables cleaning with greater force from a greater distance for a given tube 103 and 109 size.

Referring to FIG. 8, a view taken along line 8—8 illustrates the overall configuration of pole 101 as including an outer tube 103 having a tear drop shape including a predominantly circular section and the portion which is not circular angles to a sharply rounded or smaller radiused edge 131. Within the tube 103 adjacent the smaller radiused edge 131 is a guide slot 135. The guide slot 135 is about the same size and shape as a button which fits within it. At the opposite side of the tube 103 is a detent aperture 137 which interfits with a button 111 which will be seen in FIG. 9, and which will be oppositely oriented with respect to the guide slot 135.

Referring to FIG. 9, a view taken along line 9—9 of FIG. 7 is taken through a button 111 which is a detent button 111 mounted atop a spring 141 within tube 103. The detent button 111 and spring 141 assembly operates singly to provide locking of tube 103 with respect to tube 109, and is oppositely oriented with respect to the guide slot 135.

Referring to FIG. 10, a view taken along line 10—10 of FIG. 7 illustrates the structure and operation of rotational stabilization which cannot be seen from FIG. 7. A guide button assembly includes a guide button 151 and its operating spring 153 which are also within tube 103, but located rearwardly along tube 101, closest to handle 105. Guide button 151 rides within the guide slot 135. When tube 103 is inserted within tube operation of a guide slot 131 and may exert some force against the inside of the guide slot 135, but since there is so little contact area and so little force along the axis of the button 151, this is negligible.

When the tube 103 is to be first inserted in the tube 105, the button 151 is depressed against the spring 153 enough to enable button 151 to fit within the slot 135. The button 151 need not be positioned in radial alignment with the slot 135 if the button 151 is depressed even with the outside of the tube 103. In this case, the tube 109 is simply turned about its axis after insertion in order for the alignment button 151 to "find" the slot 135 and expand into it to radially lock tube 109 with respect to tube 103, but still allow tube 109 to axially slide with respect to tube 103.

Figure 11:
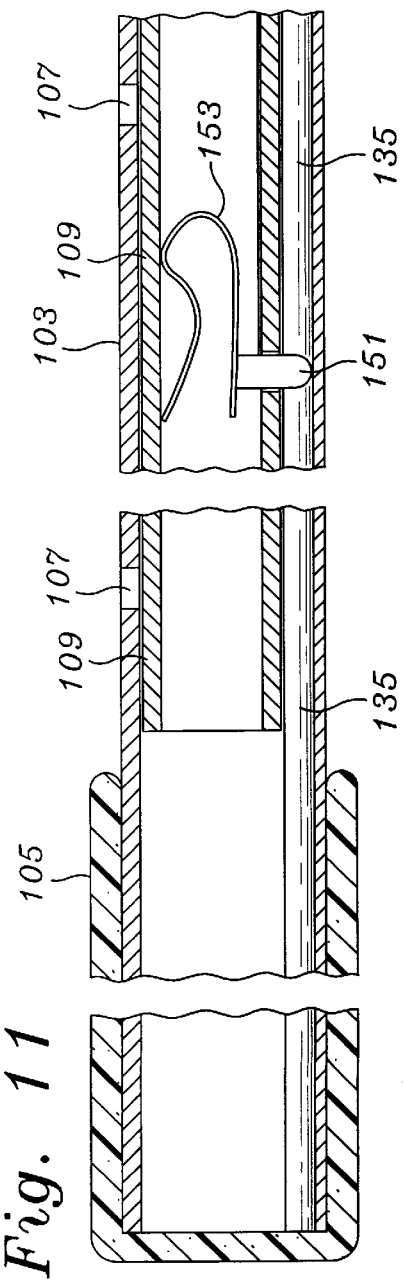
FIG. 11 is a side view of the rear end portion of the pole of the invention and illustrating the separately located guide button within the guide slot with respect to the oppositely located detent apertures.
Figure 12:
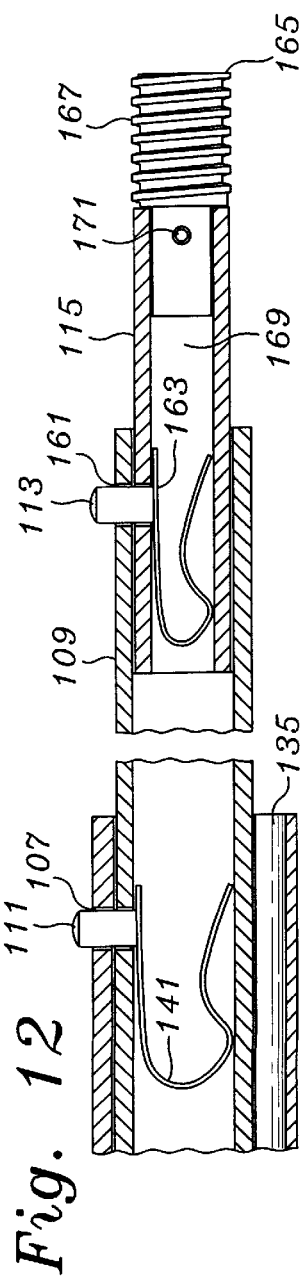
FIG. 12 is a side view of the front end portion of the pole of the invention and illustrating the separately located detent button within the inner tube, as well as a detent button located within an accessory tube engaged with the inner tube and having a threaded member at the end of the accessory tube.

Referring to FIGS. 11 and 12, a side sectional view of the pole 101 of the invention illustrates a clearer view of the structures already discussed. The springs 153 and 141 can be seen. In addition, the button 113 can be seen extending through a detent aperture 161 in the tube 109. Button 113 can be seen connected to a spring 163. The adapter tube 115 includes a threaded member 165 having a threaded end 167 and a plug end 169. A lateral aperture 171 may contain a rivet or screw to attach the threaded member 165 within the adapter 115.

The threaded end 167 attaches into the fitting 117 seen in FIG. 7.

It is to be understood that the present invention is not limited to the sole embodiment described above, but encompasses any and all embodiments within the scope of the following claims.

While the present invention has been described in terms of a pole for imparting rotational stability when used in conjunction with a cleaning tool, one skilled in the art will realize that the structure and techniques of the present invention can be applied to many similar appliances. The present invention may be applied in any situation where radial stability between two axially sliding members can be achieved with either a common groove for guiding and permitting access to locking detents or with separate guiding and locking detents to provide radial stability and quick make up of the pole structure.

Although the invention has been derived with reference to particular illustrative embodiments thereof, many changes and modifications of the invention may become apparent to those skilled in the art without departing from the spirit and scope of the invention. Therefore, included with the patent warranted hereon are all such changes and modifications as may reasonably and properly be included within the scope of this contribution to the art.

What is claimed:

1. A telescoping pole comprising:
    an outer tube having a first end and a second end defining a longitudinal axis therebetween, and having a radially closed interior surface including a slot formed by a portion of said interior surface and extending substantially the length of said interior surface of said outer tube, and an exterior surface;
    an inner tube having a cylindrical outer surface, said inner tube positioned and configured to fit closely within said outer tube in a sliding relationship along said axis;
    first resilient detent engagement structure on said inner tube for engaging said outer tube at discrete relative positions of said inner tube with respect to said outer tube to selectively permit locking of said inner tube in a telescoped position relative to said outer tube; and
    resilient rotational limiting structure on said inner tube for engaging said slot on said interior surface of said outer tube to enable axial sliding of said inner tube within said outer tube in a rotationally fixed manner.

2. A telescoping pole comprising:
    an outer tube having a first end and a second end defining a longitudinal axis therebetween, and having an interior surface including a slot extending substantially the length of said interior surface of said outer tube, and an exterior surface, and wherein said outer tube has a teardrop cross sectional shape;
    an inner tube having a cylindrical outer surface, said inner tube positioned and configured to fit closely within said outer tube in a sliding relationship along said axis;
    first resilient detent engagement structure on said inner tube for engaging said outer tube at discrete relative positions of said inner tube with respect to said outer tube to selectively permit locking of said inner tube in a telescoped position relative to said outer tube; and
    resilient rotational limiting structure on said inner tube for engaging said slot on said interior surface of said outer tube to enable axial sliding of said inner tube within said outer tube in a rotationally fixed manner.

3. The telescoping pole according to claim 2, wherein teardrop shape includes a smaller radiused edge and wherein said slot of said outer tube is located in alignment with said smaller radiused edge.

4. The telescoping pole according to claim 1, wherein said outer tube contains a plurality of first holes passing through said outer tube and serially positioned substantially along said outer tube and wherein said resilient rotation limiting structure further comprises:
    a first snap button located nearer a first end of said inner tube, said first snap button dimensioned and configured to pass through said plurality of first holes and engage said outer tube; and
    a first spring member attached to said first snap button and disposed within said inner tube such that said first spring member outwardly biases said snap button.

5. The telescoping pole according to claim 1, wherein said inner tube includes an end portion having an inner surface and at least one adapter engagement hole passing through said end portion of said inner tube, and further comprising an attachment adapter having a first end dimensioned and configured to fit in a sliding relationship with in said end portion, and a second end; and
    second resilient detent engagement structure on said attachment adapter for engaging said inner tube at said at least one adapter engagement hole to permit locking of said attachment adapter inner tube in a telescoped position relative to said outer tube.

6. The telescoping pole according to claim 5, and further comprising a cleaning member attached to said attachment adapter.

7. The telescoping pole according to claim 6 wherein said attachment adapter second end further includes a threaded member having a first plug end inserted into said second end of said attachment adapter and a threaded end for threaded engagement into a fitting.

8. The telescoping pole according to claim 7, and further comprising:
    a fitting attached to said threaded end of said threaded member of said attachment adapter;
    a universal joint connected to said fitting;
    a flat member connected to said universal joint and attached to a sponge; and
    a fleece member at least partially surrounding said flat member and said sponge.

9. The telescoping pole according to claim 1, and further comprising:
    a fitting attached to said second end of said inner tube;
    a universal joint connected to said fitting;
    a flat member connected to said universal joint and attached to a sponge; and
    a fleece member at least partially surrounding said flat member and said sponge.

10. The telescoping pole according to claim 1, and wherein said first resilient detent engagement structure on said inner tube is radially located 180° from resilient rotational limiting structure on said inner tube.

11. The telescoping pole according to claim 1, and wherein said slot of said outer tube is wider than said resilient rotational limiting structure of said inner tube to minimize frictional contact in movement of said inner tube with respect to said outer tube.

12. A telescoping cleaning tool comprising:
    a telescoping pole including:
        an outer tube having a radially closed interior, including a slot formed by a portion of said interior surface and extending substantially the length of said interior surface of said outer tube, a first end and a second end;

an inner tube having a first end within said second end of said outer tube, and a second end;

resilient rotational limiting structure on said inner tube for engaging said slot on said interior surface of said outer tube to enable axial sliding of said inner tube within said outer tube in a rotationally fixed manner;

engagement structure on said inner tube for engaging said outer tube at discrete relative positions of said inner tube with respect to said outer tube to selectively permit locking of said inner tube in a telescoped position relative to said outer tube;

a fitting attached to said second end of said inner tube having a first end attached to said second end of said inner tube and a second end;

a universal joint connected to said fitting;

a substantially planar member connected to said universal joint;

a sponge attached to said substantially planar member; and a fleece member at least partially surrounding said substantially planar member and said sponge.

13. The telescoping cleaning tool as recited in claim 12 wherein said fitting further comprises:

an adapter having a first end connected to said second end of said inner tube and a second end further including a threaded member having threaded end extending from said second end of said adapter; and wherein said universal joint includes a female threaded bore attached to said threaded end of said threaded member.

14. The telescoping cleaning tool according to claim 12, and wherein said engagement structure on said inner tube is radially located 180° from resilient rotational limiting structure on said inner tube.

15. The telescoping cleaning tool according to claim 13, further comprising a handle attached to and covering said outer tube adjacent said first end of said outer tube.

16. The telescoping cleaning tool according to claim 12, wherein said outer tube contains a plurality of first holes passing through said outer tube and serially positioned substantially along said outer tube and wherein said resilient rotation limiting structure further comprises:

a first snap button located nearer a first end of said inner tube, said first snap button dimensioned and configured to pass through said plurality of first holes and engage said outer tube; and a first spring member attached to said first snap button and disposed within said inner tube such that said first spring member outwardly biases said snap button.

17. The telescoping cleaning tool according to claim 16, and wherein said slot of said outer tube is wider than said resilient rotational limiting structure of said inner tube to minimize frictional contact in movement of said inner tube with respect to said outer tube.

18. A telescoping cleaning tool comprising:

a telescoping pole including:

an outer tube having a first end and a second end, and wherein said outer tube has a teardrop cross sectional shape;

an inner tube having a first end within said second end of said outer tube, and a second end;

a fitting attached to said second end of said inner tube having a first end attached to said second end of said inner tube and a second end;

a universal joint connected to said fitting;

a substantially planar member connected to said universal joint;

a sponge attached to said substantially planar member; and a fleece member at least partially surrounding said substantially planar member and said sponge.

19. The telescoping pole according to claim 18, wherein teardrop shape includes a smaller radiused edge and wherein said slot of said outer tube is located in alignment with said smaller radiused edge.

* * * * *